(12) United States Patent
Balakrishnan et al.

(10) Patent No.: US 9,753,839 B2
(45) Date of Patent: Sep. 5, 2017

(54) TEST SCRIPT EVALUATION SYSTEM AND METHOD

(71) Applicant: Accenture Global Services Limited, Dublin (IE)

(72) Inventors: Ravikumar Balakrishnan, Tamil Nadu (IN); Rajesh Chengalpathy, Tamil Nadu (IN); S. Yogeswaran, Chennai (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 15/074,112

(22) Filed: Mar. 18, 2016

(65) Prior Publication Data

US 2016/0275003 A1 Sep. 22, 2016

(30) Foreign Application Priority Data

Mar. 19, 2015 (IN) .......................... 1359/CHE/2015

(51) Int. Cl.
*G06F 11/36* (2006.01)
*G06F 9/44* (2006.01)

(52) U.S. Cl.
CPC ................. *G06F 11/3672* (2013.01)

(58) Field of Classification Search
None
See application file for complete search history.

(56) References Cited

U.S. PATENT DOCUMENTS

| | | | | |
|---|---|---|---|---|
| 9,317,404 | B1* | 4/2016 | Cohen | G06F 11/3684 |
| 2005/0203717 | A1* | 9/2005 | Parimi | G06F 11/263 |
| | | | | 702/188 |
| 2006/0129870 | A1* | 6/2006 | Parent | G06F 11/3688 |
| | | | | 714/1 |
| 2007/0038977 | A1* | 2/2007 | Savage | G06F 8/20 |
| | | | | 717/106 |
| 2008/0320462 | A1* | 12/2008 | Bergman | G06F 9/45512 |
| | | | | 717/168 |
| 2009/0265681 | A1* | 10/2009 | Beto | G06F 11/3688 |
| | | | | 717/100 |
| 2014/0040667 | A1* | 2/2014 | Zemer | G06F 11/3684 |
| | | | | 714/32 |
| 2016/0062876 | A1* | 3/2016 | Narayanan | G06F 11/3684 |
| | | | | 717/130 |

\* cited by examiner

*Primary Examiner* — Daxin Wu
(74) *Attorney, Agent, or Firm* — Brinks Gilson & Lione

(57) ABSTRACT

A method and a computer system include a protocol evaluation engine that evaluates a test script. The method includes receiving a test script and requirements, developing a set of protocol evaluators, evaluating the test script by comparing the protocol evaluators with the test script, determining a final score for the evaluator for the test script and generating a group score for a plurality of test scripts for identifying a tester for the test script based on the group score. The computer system includes a process and memory and processor executable instructions to carry out the above method.

16 Claims, 15 Drawing Sheets

| Evaluators | Type | Deductibles Per Deviation | Max Deductibles |
|---|---|---|---|
| Template | STOP | 100 Points | 100 Points |
| Completeness | STOP | 100 Points | 100 Points |
| Descriptiveness | PROCEED | 2 Points | 10 Points |
| Business Requirements | PROCEED | 3 Points | 45 Points |
| Validation Language Requirements | PROCEED | 3 Points | 45 Points |

FIG. 5

| Cases | Scores |
|---|---|
| Case 1 – Incorrect template used by tester | Score := 0 Points |
| Case 2 – Test script not complete and many of the section not complete | Score := 0 Points |
| Case 3 – Test script with 3 deviation for 'Descriptiveness' 10 deviations for 'Business Requirement' 10 deviations for 'Validation Language Requirements' | Score: 30 Points |

FIG. 6

| Tester | Test Script | Evaluator | Deviation | Deductibles |
|---|---|---|---|---|
| Tester1 | TS_001 | Template | Not meeting the template as the Test Objective in the test script header and requirement id in the test script header are not available in the test script created | 100 |
| Tester2 | TS_001 | Completeness | Not meeting the basic requirements as the Test Objective and requirement id in the header are left blank. These are key information for test scripts | 100 |
| Tester3 | TS_001 | Business Requirements | Business Requirements for REQ_001 is not met by the test script | 3 |
| Tester3 | TS_001 | Business Requirements | Business Requirements for REQ_006 is not met by the test script | 3 |
| | | | For Test step id 5, expected results does not capture the requirement to ensure that location is captured Requirement: User should be able to enter basic information for meals like date of invoice, vendor, location, amount, business reason | |
| Tester3 | TS_001 | Language Requirements | Expected Result: User should be able to capture date, vendor, amount, business reasons | 2 |
| Tester3 | TS_001 | Language Requirements | For Test step id 4, the expected results should use 'Should' instead of 'Shall' as per the guidelines | 2 |

FIG. 7

| Requirement ID | Module | Function | Criticality | Breif Description |
|---|---|---|---|---|
| REQ_001 | Expense | Login | High | User should be able to login using the basic credentials |
| REQ_002 | Expense | Expense Report Creation | High | User should be able to create new expense report by using the create new expense report icon |
| REQ_003 | Expense | Expense Report Creation | High | User should be able to enter basic expense information and save the expense header |
| REQ_004 | Expense | Expense Report Creation | High | User should be able to enter expense type using 'Meals' Expense in the system |
| REQ_005 | Expense | Expense Report Creation | High | User should be able to enter basic information for meals like date of invoice, vendor, location, amount, business reason |
| REQ_006 | Expense | Expense Report Creation | High | User should be able to save the expense header and entry and submit the expense report |

FIG. 8

| Test Script ID | | | |
|---|---|---|---|
| Test Objective | | | |
| Requirement ID | | | |
| Pre-Requisite | | | |
| Expected Outcome | | | |

| Test Step ID | Requirement ID | Description | Test Condition | Expected Results |
|---|---|---|---|---|
| | | | | |
| | | | | |
| | | | | |
| | | | | |
| | | | | |
| | | | | |
| | | | | |
| | | | | |

FIG. 9

| Test Script ID | TS_001 | |
|---|---|---|
| Pre-Requisite | All the user should have been setup in the system properly All the basic expense information should be available for filing expenses | |
| Expected Outcome | Expense report should be submitted successfully | |

| Test Step ID | Requirement ID | Description | Test Condition | Expected Results |
|---|---|---|---|---|
| 1 | REQ_001 | User Login | User enters the URL in web browser and enter the user id and password and upon clicking the login button the user should be logged in | System should successfully login in the user |
| 2 | REQ_002 | User create expense header | Click on 'Create new Report' | User should be able to go to new reports screen and able to create new report header |
| 3 | REQ_003 | User create expense header | User enter the basic information for the expense header like report name, business purpose and save the header | System should allow the expense report to be saved with the report name and move to expense entry screen |
| 4 | REQ_004 | Entering Meals Expense | Select the expense type as 'Meals' and | User should be able to enter the meals expense type |
| 5 | REQ_005 | Capturing Meals Information | Enter all basic information for meals | User should be able to capture date, vendor, location, amount, business reasons |
| 6 | REQ_006 | Expense Report Submission | Submit Expense report after verifying all the information | User should be able to submit expense report after entering all the information |

FIG. 10

| Test Script ID | TS_001 | | |
|---|---|---|---|
| Test Objective | | | |
| Requirement ID | | | |
| Pre-Requisite | All the user should have been setup in the system properly<br>All the basic expense information should be available for filing expenses | | |
| Expected Outcome | Expense report should be submitted successfully | | |

| Test Step ID | Requirement ID | Description | Test Condition | Expected Results |
|---|---|---|---|---|
| 1 | REQ_001 | User Login | User enters the URL in web browser and enter the user id and password and upon clicking the login button the user should be logged in | System should successfully login in the user |
| 2 | REQ_002 | User create expense header | Click on 'Create new Report' | User should be able to go to new reports screen and able to create new report header |
| 3 | REQ_003 | User create expense header | User enter the basic information for the expense header like report name, business purpose and save the header | System should allow the expense report to be saved with the report name and move to expense entry screen |
| 4 | REQ_004 | Entering Meals Expense | Select the expense type as 'Meals' and | User should be able to enter the meals expense type |
| 5 | REQ_005 | Capturing Meals Information | Enter all basic information for meals | User should be able to capture date, vendor, location, amount, business reasons |
| 6 | REQ_006 | Expense Report Submission | Submit Expense report after verifying all the information | User should be able to submit expense report after entering all the information |
| | | | | |
| | | | | |
| | | | | |
| | | | | |

FIG. 11

| Test Script ID | TS_001 |
|---|---|
| Test Objective | Ensure user is able to create and submit meals expense type |
| Requirement ID | REQ_001, REQ_002, REQ_003, REQ_004, REQ_005, |
| Pre-Requisite | All the user should have been setup in the system properly<br>All the basic expense information should be available for filing expenses |
| Expected Outcome | Expense report should be submitted successfully |

| Test Step ID | Requirement ID | Description | Test Condition | Expected Results |
|---|---|---|---|---|
| 1 | REQ_001 | User Login | User enters the URL in web browser and enter the user id and password and upon clicking the login button the user should be logged in | System should successfully login in the user |
| 2 | REQ_002 | User create expense header | Click on 'Create new Report' | User should be able to go to new reports screen and able to create new report header |
| 3 | REQ_003 | User create expense header | User enter the basic information for the expense header like report name, business purpose and save the header | System should allow the expense report to be saved with the report name and move to expense entry screen |
| 4 | REQ_004 | Entering Meals Expense | Select the expense type as 'Meals' and | User should be able to enter the meals expense type |
| 5 | REQ_005 | Capturing Meals Information | Enter all basic information for meals | User should be able to capture date, vendor, amount, business reasons |
| | | | | |
| | | | | |
| | | | | |
| | | | | |
| | | | | |

FIG. 12

| Employee ID | Employee Name | CrowdSource Project | Testing Category | Test Type | Technology | #Test Scripts/Protocol | Score | Technology Weight | Test Type Weight | Aggregate Score |
|---|---|---|---|---|---|---|---|---|---|---|
| 12345891 | John Smith | PRJ_CRD_PRJ_001 | Non-Validated Testing | Regression Testing | SAP | 66 | 94 | 2 | 0.75 | 232.65 |
| 12345892 | Trevor Mark | PRJ_CRD_PRJ_005 | Validated Testing | Performance Qualification | PeopleSoft | 46 | 97 | 1.25 | 2 | 189.635 |
| 12345892 | Trevor Mark | PRJ_CRD_PRJ_006 | Validated Testing | Operational Qualification | WorkDay | 48 | 86 | 1.25 | 1.75 | 165.12 |
| 12345892 | Trevor Mark | PRJ_CRD_PRJ_004 | Validated Testing | Performance Qualification | SAP | 66 | 85 | 2 | 2 | 28.05 |
| 12345892 | Trevor Mark | PRJ_CRD_PRJ_005 | Validated Testing | Operational Qualification | Concur | 44 | 96 | 1 | 1.75 | 158.4 |
| 12345891 | John Smith | PRJ_CRD_PRJ_001 | Non-Validated Testing | System Testing | SAP | 46 | 86 | 2 | 1 | 158.24 |
| 12345892 | Trevor Mark | PRJ_CRD_PRJ_003 | Validated Testing | Performance Qualification | WorkDay | 49 | 75 | 1.25 | 2 | 156.1875 |
| 12345892 | Trevor Mark | PRJ_CRD_PRJ_004 | Validated Testing | Operational Qualification | SAP | 41 | 75 | 2 | 1.75 | 146.025 |
| 12345891 | John Smith | PRJ_CRD_PRJ_002 | Non-Validated Testing | System Testing | Concur | 49 | 99 | 1 | 1 | 145.53 |
| 12345892 | Trevor Mark | PRJ_CRD_PRJ_005 | Non-Validated Testing | System Testing | PeopleSoft | 46 | 95 | 1.25 | 1 | 142.025 |
| 12345892 | Trevor Mark | PRJ_CRD_PRJ_004 | Non-Validated Testing | Regression Testing | SAP | 42 | 88 | 2 | 0.75 | 138.6 |
| 12345891 | John Smith | PRJ_CRD_PRJ_003 | Validated Testing | Installation Qualification | PeopleSoft | 47 | 77 | 1.25 | 1.5 | 135.7125 |
| 12345891 | John Smith | PRJ_CRD_PRJ_001 | Non-Validated Testing | Integration Testing | SAP | 32 | 92 | 2 | 1.25 | 125.12 |
| 12345892 | Trevor Mark | PRJ_CRD_PRJ_005 | Validated Testing | Performance Qualification | PeopleSoft | 41 | 89 | 1.25 | 2 | 120.2325 |
| 12345892 | Trevor Mark | PRJ_CRD_PRJ_006 | Validated Testing | Operational Qualification | WorkDay | 50 | 60 | 1.25 | 1.75 | 120 |
| 12345891 | John Smith | PRJ_CRD_PRJ_003 | Validated Testing | Performance Qualification | PeopleSoft | 39 | 70 | 1.25 | 2 | 116.025 |

FIG. 13

| Employee ID | Employee Name | # Test Scripts/Protocols Authored | Aggregate IPEC Score | Total Non-Validated | | Non-Validated Testing | | | | | | | | | | | | | | | | | | |
|---|---|---|---|---|---|---|---|---|---|---|---|---|---|---|---|---|---|---|---|---|---|---|---|---|
| | | | | | | System Test | | Integration Test | | Regression Test | | In Field Test | | Validated Testing (eg. of Testing) | | | | | | SAP Test | | PeopleSoft Test | Concur Test | Workday Test |
| | | | | | Avg. Score | # | Avg. Score | # | Avg. Score | # | Avg. Score | # | Avg. Score | # | Trade Promo Optimization | Loyalty Program Qualification | Performance Benchmarking | | | Avg. Score | # | Avg. Score # | Avg. Score # | Avg. Score # |
| | | | | | | | | | | | | | | | Avg. Score # | Avg. Score # | Avg. Score # | | | | | | | |
| 12345891 | John Smith | 1,927 | 2,874 | 750 | 76 | 380 | 76 | 262 | 74 | 108 | 86 | 677 | 67 | 155 | 62 | 291 | 67 | 231 | 73 | | 71 | 332 | 75 408 | 71 332 | 69 335 |
| 12345892 | Trevor Mark | 1,454 | 3,030 | 752 | 70 | 380 | 67 | 304 | 66 | 168 | 95 | 702 | 80 | 213 | 81 | 304 | 77 | 105 | 85 | | 72 | 390 | 75 380 | 81 336 | 73 340 |

FIG. 14

TEST SCRIPT EVALUATION SYSTEM AND METHOD

RELATED APPLICATIONS

This application claims priority to Indian Patent Application No. 1359/CHE/2015, filed Mar. 19, 2015.

FIELD OF THE TECHNOLOGY

The disclosure relates to the field of software development, and more particularly to a test script evaluation system and method.

BACKGROUND OF THE TECHNOLOGY

Software testing provides an independent view of the software and constitutes an important part of the software development. A test script may be a set of instructions to perform the software testing to ensure the software system functions as expected. However, it may be a challenge to determine the effectiveness of the test script. Particularly, it may be a challenge to automated selection of test script from suite of test script in order to identify the best one to be used for execution. As such, there are technical problems to be resolved for automated evaluation of the test script for identifying the suitable test script and automated evaluation of the testers.

SUMMARY

Examples of the present disclosure provide at least a method and a system for evaluating one or more test scripts by using a protocol evaluation engine.

A method may be provided for evaluating one or more test scripts by using a protocol evaluation engine. The method may include steps of receiving, via a communications interface, a test script and more than one requirements for the test script wherein the more than one requirements may be used to evaluate the test script and may be in pre-determined format, developing a set of protocol evaluators by using the more than one requirements wherein the set of protocol evaluators may include business requirements, validation language requirements, template, completeness and descriptiveness, wherein each protocol evaluator may contain one or more factors.

The method may further include steps of evaluating the test script with the protocol evaluation engine being executed on a computer processor by: comparing the one or more factors of the protocol evaluators with the test script, and determining whether the test script deviates with at least one of the one or more factors, and in response assigning a deviation thereto, assigning an initial score to the test script, determining a deductible points for each deviation according to a pre-determined rule up to a maximum deductible points, and determining a final score for the evaluator for the test script by subtracting the deductible points from the initial score for the test script to obtain the final score, generating a group score for a plurality of test scripts based on a pre-determined category and the final score of the plurality of test scripts for identifying a tester for the test script based on the group score.

The present disclosure provides a computer system. The computer system may include a processor coupled with a communications interface and a non-transitory computer readable medium storing processor executable instructions comprising a protocol evaluation engine that evaluates one or more test scripts configured to cause the processor to: receive a test script and more than one requirements for the test script via the communications interface, wherein the more than one requirements may be used to evaluate the test script and may be in pre-determined format, and develop a set of protocol evaluators stored in the non-transitory computer readable computer readable medium by using the more than one requirements wherein the set of protocol evaluators comprises business requirements, validation language requirements, template, completeness and descriptiveness, wherein each protocol evaluator contains one or more factors.

The computer system may further include instructions that may cause the one or more processors to evaluate the test script by: comparing the one or more factors of the protocol evaluators with the test script, and determining whether the test script deviates with at least one of the one or more factors, and in response assigning a deviation thereto, assigning an initial score to the test script, determining a deductible points for each deviation according to a pre-determined rule up to a maximum deductible points, and determining a final score for the evaluator for the test script by subtracting the deductible points from the initial score for the test script to obtain the final score.

The computer system may further include instructions that may cause the one or more processors to generate a group score for a plurality of test scripts based on a pre-determined category and the final score of the plurality of test scripts for identifying a tester for the test script based on the group score.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 5 shows an example of the test script evaluation points for evaluators.

FIG. 6 shows an example of the final scores for the test script.

FIG. 7 shows an example of tester, deviations, test script, evaluator, deviation and deductible points for the test script in FIG. 6.

FIG. 8 shows an example of the sample requirement specification that is used to evaluate test scripts.

FIG. 9 shows an example of a template for a test script.

FIG. 10 shows an example of a test script with an incorrect template.

FIG. 11 shows an example of a test script that is not complete.

FIG. 12 shows an example of a test script with deviations.

FIG. 13 shows an example of rolling up scores for a test group.

FIG. 14 shows an example of rolling up scores to individual testers.

DETAILED DESCRIPTION OF ILLUSTRATED EXAMPLES

Figure 1:
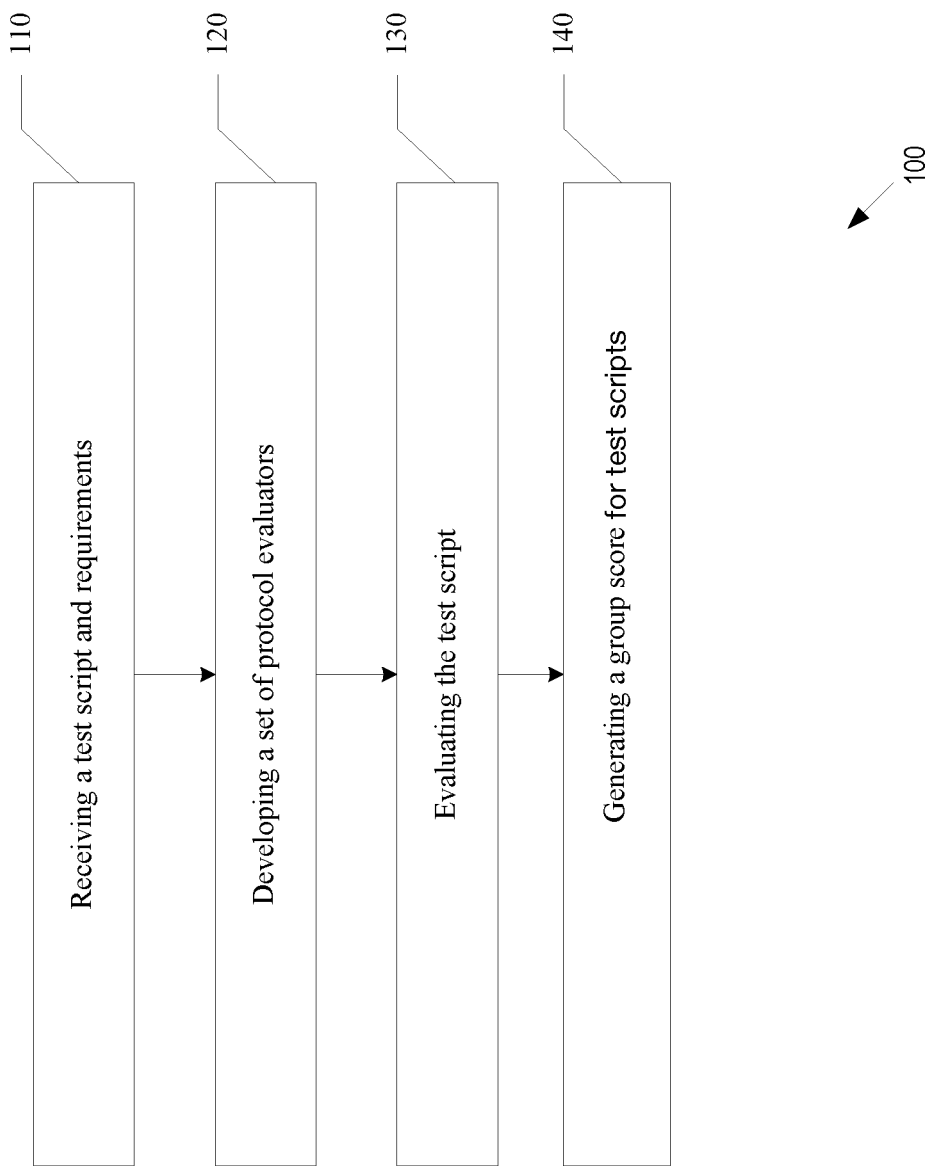
FIG. 1 shows a flowchart of one embodiment of a method for evaluating one or more test scripts by using a protocol evaluation engine.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. The examples described thereinafter are merely a part of examples of the present disclosure, not all examples. Persons skilled in the art can obtain all other examples without creative works, based on these examples.

In crowd sourced testing, "one to many" model may be used for the test case creation. However, in the "one to many" model, requirements may be distributed to many resources of a project team and each resource may create the test script independently. The project team may face the challenge of going through many test scripts to choose the right test script for the particular work. Such a selection process may be labor intensive, and the labor intensive selection may reduce the benefits of crowd source testing, and may cause the failure of crowd sourcing testing model. As such, the evaluation of the test script may be needed for identifying the suitable test scripts. The evaluation may be needed for allocating requirements to crowd sourced testing team based on their effectiveness In the GxP Testing of the life sciences industry, all the GxP requirements may be validated through the validated testing process that may involve testing the solution for Installation Qualification (IQ), Operational Qualification (OQ) and Performance Qualification (PQ). All the protocol (test scripts) created for GxP testing may go through a rigorous review with client quality and compliance. Most of the feedback during reviews may be around the language as many protocols may fail to meet the standard language to be used. As such, lack of protocol (test scripts) evaluation may lead to the increased rework, the increased cost, potential delays during project execution, and the opportunity lost to competition. As such, the evaluation of the test scripts (protocol) may also be needed in the complex testing such as GxP testing.

As estimated, an average project with a size of 100K USD, 10K USD may be spent on review and rework. Thus, the effort to reduce review and rework may be needed. The evaluation of test scripts may reduce the review and rework.

The protocol evaluation engine (PEE) may be a computer system that uses artificial intelligence techniques to evaluate the protocol or test scripts and calculate a score for the test scripts. PEE may take the business requirements and test protocol to be evaluated as input and may deliver the test script score card and detailed deviation logging. The score card generated may rate the test scripts based on the number of deviations in the test script. Detailed logging may provide the details of all the deviation for the evaluation and correction. PEE may evaluate the protocol (the test script) using set of pre-defined rules with an inbuilt rules engine. PEE may evaluate the test script based on format, language, requirement coverage, completeness, descriptiveness. The result of PEE may also provide the project team information for identifying the suitable resource for the one or more test scripts.

FIG. 1 is a flowchart of one embodiment of a method for evaluating one or more test scripts by using a protocol evaluation engine 100. Steps shown in FIG. 1 may be performed by one or more processors to execute instructions stored in the non-transitory computer readable medium.

Step 110: Receiving a test script and requirements. Examples of step 110 may include: receiving, via a communications interface, a test script and more than one requirements for the test script, wherein the more than one requirements may be used to evaluate the test script and may be in pre-determined format.

The test script and the requirements may be received by PEE by using an interface (may also be called a communication interface). The PEE may develop an interface for a user (a user interface) or one or many programs (an input interface) to input the test script for PEE to evaluate. The test script received by the interface may be in a format that may be recognizable by PEE. The interface may also reformat the test script to a format that may be recognized by PEE. Thus, after PEE receives the test script via the interface (either the user interface or the input interface), the test script may be in a format that may be recognized by PEE. Although the received formatted test script may be not valid or may have defects, however, the interface may ensure the test script is in the format that may be evaluated by PEE. The PEE recognizable format may be pre-determined. The PEE may also allow the user to define a format for test script through the user interface. There may be multiple formats for a plurality of test scripts. PEE may develop a software program to recognize the multiple formats of the test scripts.

The requirements may be formatted by the interface. The requirements may be retrieved from the requirement documents by using a program via the input interface. PEE may accept requirements from a user directly via a user interface. No matter the received requirements may be from the requirement documents or from the user directly, the requirements may be recognizable after they are received by PEE via the interface. The received requirements may be in the format that is recognizable by PEE, or the interface may reformat the received requirements into the PEE recognizable format. The interface may ensure the requirements may be recognized after the requirements are received and stored in the non-transitory computer readable medium (may be a repository) of the PEE. The requirement documents may be in multiple formats and PEE may recognize multiple formats for the requirement documents.

Step 120: Developing a set of protocol evaluators. Examples of step 120 may include: developing a set of protocol evaluators stored in a computer readable memory by using the more than one requirements, wherein the set of protocol evaluators may include business requirements, validation language requirements, template, completeness and descriptiveness, wherein each protocol evaluator may contain one or more factors.

A number of evaluators (may also be called protocol evaluators) may be used by PEE. Evaluators may include: business requirements, validation language requirements, template, completeness and descriptiveness. The evaluators may also be called parameters. Each evaluator may contain one or more factors. The business requirements may contain a plurality of rules and each rule may be a factor used by PEE to evaluate the test script (or protocol). For example, the business requirement for creating an expense report may contain multiple steps and each step may be a factor for evaluating the test script. The evaluators may be developed according to one or more requirements received from the interface for the test scripts and the test evaluators may be stored in the computer readable memory after they are developed.

Multiple evaluators may be used together. Business requirements may be used together with validation language requirements for evaluating the test script. For example, a business requirement may contain certain language and if the test script does not contain such language, the test script may violate the business requirement, however, at the same time, because the test script does not contain the language, the test script may also violate the relevant validation language requirement.

Descriptiveness may also be used together with the evaluator of business requirements. For example, each business requirement may have a description. If the description for a test script is different from the description provided in the relevant business requirement, the test script deviates from the description of the business requirement. The test script thus violates the business requirement. Also, because the evaluated test script is not properly descripted, the test script may also have a descriptiveness violation. When the evaluators or factors are violated, the test script may be considered departing from the expected outcome. As such, a violation to one or more evaluators or one or more factors of the evaluators may also be called a deviation.

Not all deviations may be equal during the test script evaluation. Some deviations may affect the quality of the test script more seriously than other deviations. For example, when a test script does not use the right template, the format of the test script is wrong, the test script therefore may not be used for what the test script is designed for. Thus, the template deviation may seriously affect the quality of the test script. Some other deviations may be relatively minor. For example, the test script bears a description as "a user shall login" rather than "a user should login" provided in the business requirement, the test script may be identified for having a deviation on the evaluation regarding validation language requirements. However, such a deviation may not seriously affect the use of the test script. Thus, at least for the above example, the deviations on validation language requirements may less seriously affect the quality of the test script than deviations on the evaluation for the template. Another example of a serious deviation may be an incomplete test script. An incomplete test script may not be used properly. As a result, the deviations for the evaluation by using evaluator completeness may be serious deviations.

Figure 2:
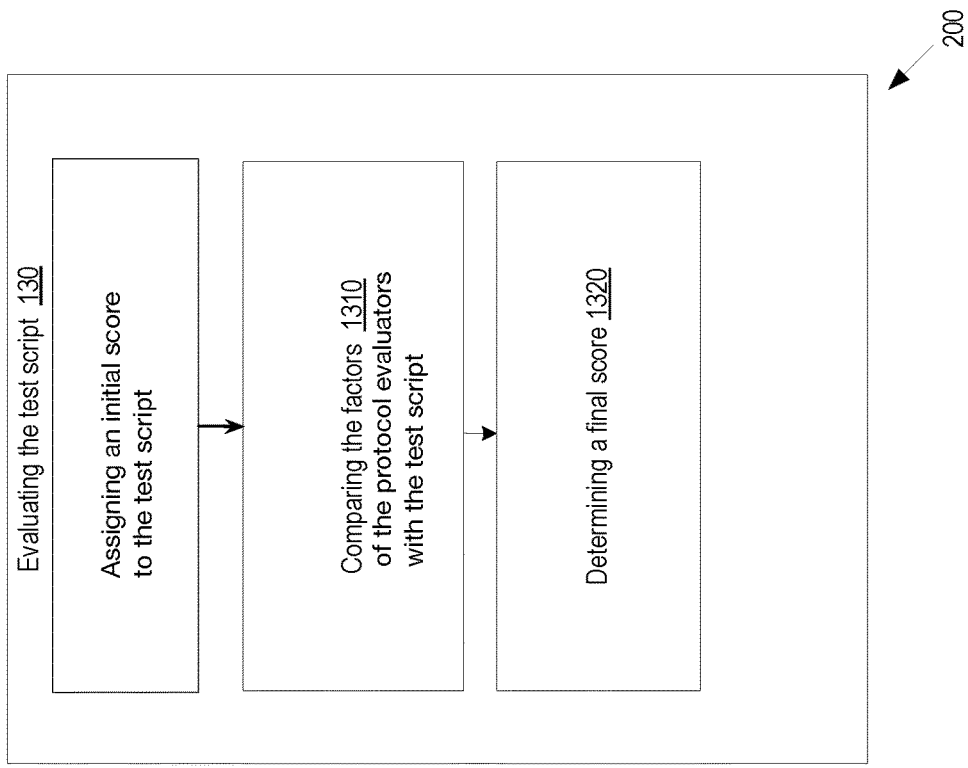
FIG. 2 shows a flowchart of evaluating the test script in FIG. 1.

Step 130: Evaluating the test script. FIG. 2 shows a flowchart of the evaluating the test script in FIG. 1. As shown in FIG. 2, evaluating the test script with the protocol evaluation engine being executed on a computer processor may include comparing the factors and determining a final score. Examples of evaluating the test script may include:

comparing the one or more factors of the protocol evaluators with the test script, and determining whether the test script deviates with at least one of the one or more factors, and in response assigning a deviation thereto, and assigning an initial score to the test script, determining a deductible points for each deviation according to a pre-determined rule up to a maximum deductible points, and determining a final score for the evaluator for the test script by subtracting the deductible points from the initial score for the test script to obtain the final score.

A deviation for a test script may be determined when the test script deviates with at least one of the one or more factors. Deviations may be captured during review of protocol (test script) against Evaluators by PEE. The test script may be compared with the one or more factors of the protocol evaluators as discussed above. A deviation may be determined when the test script deviates with at least one of the one or more factors. The number of deviations for each evaluator may be calculated and determined after the evaluation is done.

The deductible points may be determined per deviation and the deductible points may be added up for each evaluator. The deductible points may be assigned for each deviation. Each evaluator may have the deductible points that may be equal to the sum of the deductible points for deviations for the evaluator. For example, if the evaluator for business requirements has two deviations, and the deviation one is assigned two (2) deductible points, and deviation two is assigned three (3) deductible points, the deductible points for the business requirements may be five (5) deductible points. The amount of deductible points for each deviation may be pre-determined and saved in the data storage of PEE. When a deviation is determined, the deductible points for the deviation may be retrieved from the data storage of PEE. The deductible points for different deviations of an evaluator may be different. As shown in the example above, deviation one is assigned two (2) deductible points and deviation two is assigned three (3) deductible points.

The final score for each test script may be calculated and determined by using the deductible points. For example, an initial score of 100 points may be allocated to each test script (protocol), and points may be deducted from the initial score of 100 points based on deviations found by PEE and deductible points for the found deviations for each of evaluators for the test scripts. For example, if one test script has three evaluators of business requirements, validation language requirements and descriptiveness, and deductible points are 10, 0 and 20 respectively, the final score may be determined by subtracting the deductible points of each evaluators from the initial score 100 for the test script. Here, the final score for the example may be calculated as: 100−10−0−20=70. Thus, the final score may be 70 for the test script.

Each evaluator may carry the maximum deductible points for each test script (protocol). For example, the maximum deductible points for the evaluator of descriptiveness may be 50 per test script. As such, even though the sum of deductible points for deviations for the evaluator of descriptiveness for one test script is 60, the maximum deductible points of 50 may be used for calculating the final score for the evaluator descriptiveness for this test script.

Some of the evaluators may be "stop" evaluators. When a deviation for the "stop" evaluator is identified, the final score of zero (0) may be assigned to the test script and the evaluation may be terminated for the test script. For example, the evaluator of completeness is the "stop" evaluator, when one test script is determined that there is a deviation for the completeness evaluator, for example, the test script misses one element, the final score for the test script may be determined to be zero (0), and the evaluation for the test script may thus be terminated.

Step 140: Generating a group score. Examples of step 140 may include: generating a group score for a plurality of test scripts based on a pre-determined category and the final score of the plurality of test scripts for identifying a tester for the test script based on the group score Each test script (protocol) score may be rolled up-to the crowd source tester. One tester may be assigned multiple test scripts. Test scripts for one tester may be different. For example, some test scripts may be developed for SAP technology and for the unit test, and some other test scripts may be developed for Oracle technology and for the integration test. Thus, the final scores of test scripts for each tester may be added up and grouped together by different categories.

The test script score rolled up may have two steps. First, final scores of test scripts may be added up and grouped together by a category group including a number of categories such as: employee id, project id, testing categories (validate test or non validated test), test type (unit test, regression test or integration test etc.), and technology. After the raw final score (may be either the total score or the average score) of the group is determined, the aggregate score for the category group may be determined. The aggregate score may be calculated by multiplying the average raw final score of the test scripts with weighted factors. For example, the tester John Smith with employee id 101 may be assigned with two (2) valid test scripts for the regression test in SAP technology area. The raw final scores for test scripts may be 90 and 60. The average score for the category group may be calculated by: (90+60)/2=75. The weighted factor for SAP technology may be 2 and the weighted factor for the regression test may be 0.75. Thus, the aggregate score for this category group may be calculated as:

$$75 \times 2 \times 0.75 = 112.5$$

The second step for rolling up the test scores may be to add up and group together the aggregate scores obtained in the first step and/or final scores of the test scripts to a second category group having a number of categories for each tester. The second category group developed for each tester in the second step may or may not be different from the category group used in the first step. Each category in the second category group for the tester may or may not relate to any categories in the category group in the first step. For example, after the aggregate scores are determined for the category group in the first step. In the second step, the aggregate scores for tester John Smith may be added up, and his average scores for each test type and each technology may also be calculated. By this way, the strength and weakness of each tester in various areas may be evaluated and determined. For example, if John Smith has the average score of 75 for the SAP technology and another tester John Doe has the average score of 65 for the SAP technology, John Smith may show a strength in testing in the SAP technology area over John Doe.

Following categories may be part of an example for the second category group for evaluating individual testers:

'Test Type Based Score' may be average score for Installation Qualification, Operational Qualification, Performance Qualification, System, Integration and UAT scripts.

'Technology Based Score' may be average score based on technology (SAP, Oracle etc.)

'Domain Based Score' may be average score based on domain (LS R&D, LS Enabling Functions etc.).

'Validated Testing Score' may be average score based on the test protocols written for validated testing.

'Non-Validated Testing Score' may be average score based on the test scripts written for non-validated testing.

'First Time Right (FTP) Score' may be average score based on number of review comments received and resolved per test protocol/script.

'Protocol Evaluation Concept (PEC) Score' may be weighted average score based on all the above parameters (evaluators) for a particular tester.

The score outputs for various categories of the second category group as shown above may be generated for each tester. The generated score outputs may be used for identifying for evaluating each tester. Thus, the project team may use the generated score outputs to identify the required crowd sourced tester for the suitable one or more test scripts.

The second group category scores may be used for identifying the tester for the certain type of test scripts. For example, if one tester has 70 for the SAP technology while another test has 50 for the SAP technology, the tester one may be identified as the more suitable tester than the tester two for creating test scripts for the SAP technology. As such, the group category score may provide the quantitative analysis for the project team to identify the suitable resource for creating the test scripts. This may be particularly useful in the crowd sourced testing when multiple resources can create the test scripts in multiple locations.

Figure 3:
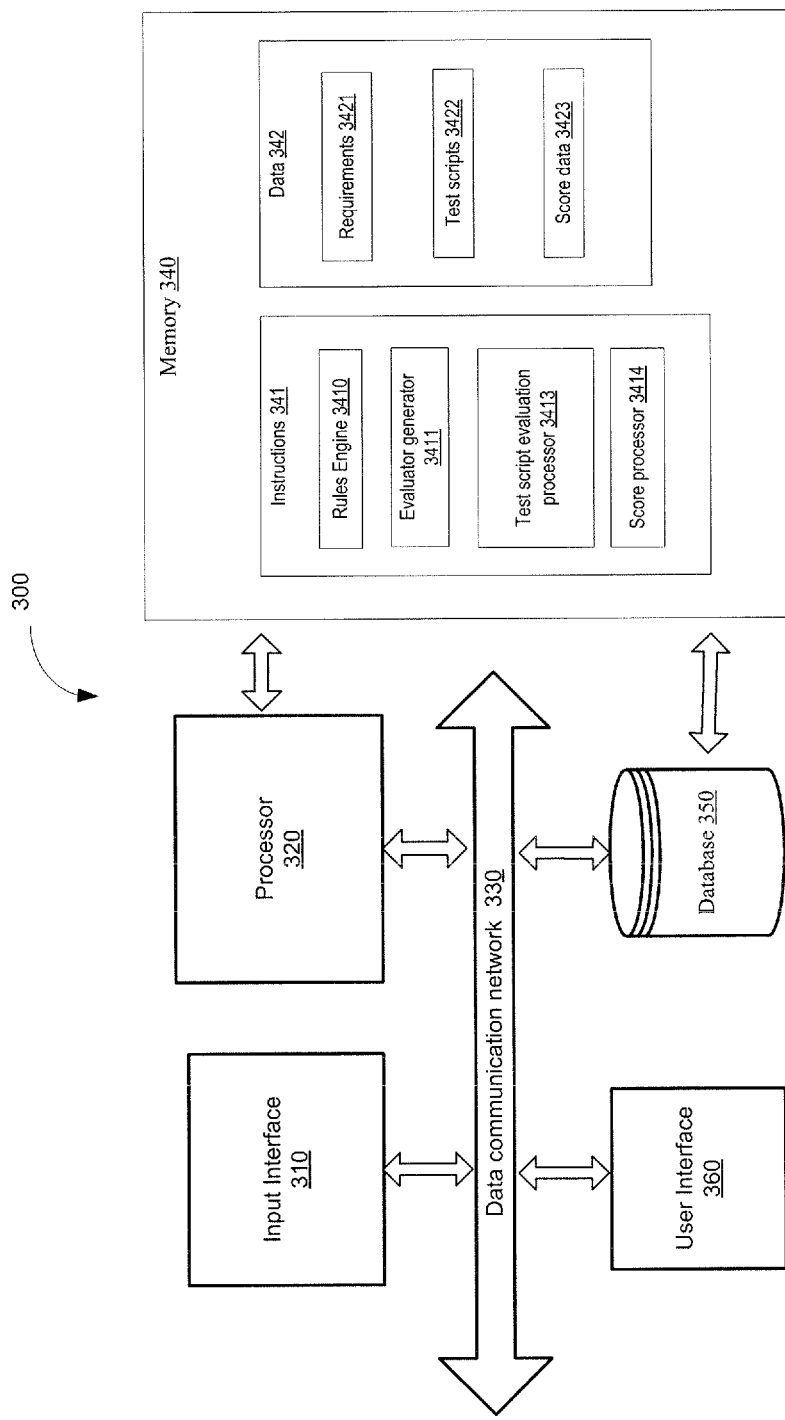
FIG. 3 illustrates one embodiment of a computer system for evaluating one or more test scripts.

FIG. 3 illustrates one embodiment of a computer system for evaluating one or more test scripts. As shown in FIG. 3, the computer system 300 may include one or more processors coupled with a communications interface including the input interface, the user interface, the database and memory. The data communication network may be used to connect with one or more processors, the input interface, the user interface, the database and the memory. The memory may include instructions and the data. The instructions may include rule engine, evaluator generator, test script evaluation processor and score processor. The data may include requirements, test scripts and score data.

One example implementation of the computer system 300 may include one or more processors and the non-transitory computer readable medium (memory) storing processor executable instructions of the rule engine that may be configured to cause the one or more processors to: receive a test script and more than one requirements for the test script via the communications interface, wherein the more than one requirements may be used to evaluate the test script and may be in pre-determined format.

The computer system 300 may also include instructions for evaluator generator that may be configured to cause the one or more processors to: develop a set of protocol evaluators stored in the non-transitory computer readable computer readable medium by using the more than one requirements wherein the set of protocol evaluators may include business requirements, validation language requirements, template, completeness and descriptiveness, wherein each protocol evaluator contains one or more factors.

The computer system 300 may further include instructions for test script evaluator processor that may be configured to cause the one or more processors to: evaluate the test script by: comparing the one or more factors of the protocol evaluators with the test script, and determining whether the test script deviates with at least one of the one or more factors, and in response assigning a deviation thereto, and assigning an initial score to the test script, determining a deductible points for each deviation according to a pre-determined rule up to a maximum deductible points, and determining a final score for the evaluator for the test script by subtracting the deductible points from the initial score for the test script to obtain the final score.

The computer system 300 may include addition instructions for the score processor that may be configured to cause the one or more processors to: generate a group score for a plurality of test scripts based on a pre-determined category and the final score of the plurality of test scripts for identifying a tester for the test script based on the group score.

The computer system 300 may further include instructions for the test script evaluation processor that may be configured to cause the one or more processor to determine a predetermined subset of deviations, and the corresponding deductible points for the subset of deviations may include the initial score as the deductible points for the deviation such that upon subtracting the deductible points from the initial score, a zero point score may be allocated as the final score, and the evaluating process may be terminated. For example, the subset of deviations may include the test script that may not be in a right template or the test script may not be completed.

Instructions for the score processor of the computer system 300 configured to cause the one or more processors to generate the group score may further include instructions that may be configured to cause the one or more processor to add up the final scores according to the pre-determined category. The group score may further include a tester based score and a test script based score. The tester based score may include an identification for the tester and the test script based scored may include an aggregate score that may be computed according to the final score.

Instructions for the score processor of the computer system 300 configured to cause the one or more processors to generate the group score may further comprise instructions configured to cause the one or more processors to generate the tester based score by using the aggregate score wherein the tester based score may include a plurality of pre-determined tester categories.

Figure 4:
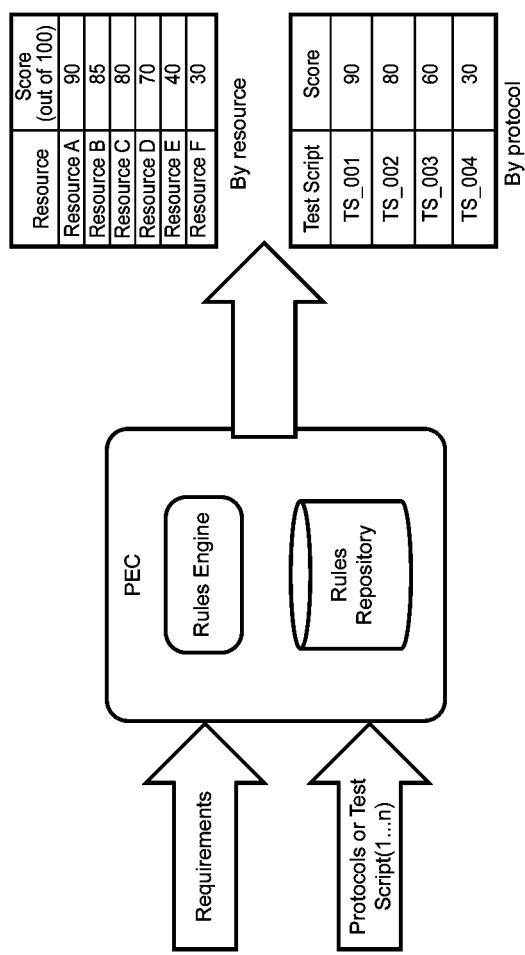
FIG. 4 shows an example of the flow diagram of the computer system for evaluating one or more test scripts.

FIG. 4 shows an example of the flow diagram of the computer system for evaluating one or more test scripts. As shown in FIG. 4, requirements and test scripts (protocols) may be input to the protocol evaluation concept (PEC). The PEC may be embodied as the computer system, which may also be called the protocol evaluation engine (PEE). The rules engine and rules repository may be part of the PEC, the computer system or PEE. The rule engine may include instructions to receive and reformat received requirements and test scripts. The rule engine may be further configured to cause one or more processors to evaluate the test scripts according to the requirements. The rules repository may be any type of non-transitory computer readable medium that may store data for the test script evaluation. The output of the test script evaluation may include scores by resources. Each resource may have a score for the test scripts allocated to the resource. The tester who creates the test scripts may be the resource for the test scripts. The output of the test script evaluation may include scores by test scripts. Each test script may be provided a score after the test script evaluation.

FIG. 5 shows an example of the test script evaluation points for evaluators. As shown in FIG. 5, five (5) evaluators may be used for test script evaluation. The five evaluators may be template, completeness, descriptiveness, business requirements and validation language requirements. Each evaluator may have a type of "stop" or "proceed." When an evaluator has a type of "stop," the deductibles for any deviation of the evaluator will have the maximum deductible points (100 points as shown in FIG. 5). In FIG. 5, the evaluator for template has the type of "stop". Any deviation for this evaluator may have 100 deductible points which may be the maximum deductible points.

Some evaluators shown in FIG. 5 have a type of "proceed." When the evaluators have the type of "proceed," the deviations for those evaluators may be assigned the deductible points. For example, each deviation for the evaluator descriptiveness may be assigned two (2) deductible points. And, each deviation for the evaluator business requirements may be assigned three (3) deductible points.

The maximum deductible points may be set for each evaluator. As discussed above, the evaluators of the type of "stop" may have the maximum deductible points of 100. The evaluators of the type "proceed" may also have the maximum deductible points. For example, the maximum deductible points for the evaluator descriptiveness may be 10 and the maximum deductible points for business requirements may be 45.

FIG. 6 shows an example of the final scores for the test script. As shown in FIG. 6, the test cases with the deviations of incorrect template used by tester and the incomplete test script have 0 points as their scores. In FIG. 6, the case 3 has 30 points as the final points. The case 3 may have three (3) deviations for "descriptiveness," ten (10) deviations for "business requirement," and ten (10) deviations for "validation language requirements."

FIG. 7 shows an example of tester, deviations, test script, evaluator, deviation and deductible points for the test script with final scores in FIG. 6. As shown in FIG. 7, tester Tester1, Tester2 and Tester3 have created test script TS_001 based on requirements. The deviation descriptions for evaluators and the deductible points for each deviation are also shown in FIG. 7. For example, test script TS_001 for Tester1 may have a deviation on the evaluator "Template," the deviation may be descripted as "Not meeting the template as the Test Objective in the test script header and requirement in the test script header are not available in the test script created." This deviation shows 100 points as the deductibles.

FIG. 8 shows an example of the sample requirement specification that is used to evaluate test scripts. FIG. 8 shows an example of the requirement specification that may have six (6) requirements. As shown in FIG. 8, each requirement is identified by the requirement id. All requirements may be for the module of expense. The function for each requirement id may be different. As shown in FIG. 8, the function for requirement id REQ_001 is login, and its criticality is high. The brief description for requirement id REQ_001 is shown as "User should be able to login using the basic credentials."

FIG. 9 shows an example of a template for a test script. The template shown in FIG. 9 for the test script includes header fields including test script id, test objective, requirement id, pre-requite, expected outcome. Further, the template in FIG. 9 provides space for test steps including: test step id, requirement id, description, test condition and expected results.

FIG. 10 shows an example of a test script with an incorrect template. The test script in FIG. 10 includes header fields of: test script ID, pre-requite and expected outcome. Because the header fields in FIG. 10 miss the test objective and requirement id as shown in FIG. 9, the test script in FIG. 10 does not have a correct template. As discussed above, the evaluator template may be a "stop" evaluator, the deviation for the template evaluator may cause the assignment of maximum deductible points to the test script and the termination the evaluation. As such, even though the test script in FIG. 10 also include test steps for the test script, those test steps may not be evaluated because the zero final points may be assigned to the test script and the evaluation may be terminated as the test script is in an incorrect template.

FIG. 11 shows an example of a test script that is not complete. The test script in FIG. 11 shows the header fields of test script id, test objective, requirement id, pre-requite and expected outcome. The header fields of the test script in FIG. 11 have all five (5) fields as shown in the template of FIG. 9. However, because the fields test script id and test objective of the header fields of test script in FIG. 11 are blank, the test script of FIG. 11 may be considered incomplete test script. As such, the zero final points may also be assigned to the test script shown in FIG. 11 and the evaluation for the test script may also be terminated.

FIG. 12 shows an example of a test script with deviations. The test script in FIG. 12 shows all header fields as provided in the template of FIG. 9. In addition, all five (5) header fields of the test script in FIG. 12 have values. None of the header fields is blank. As such, the template may not have a deviation for either the template evaluator or the completeness evaluator. The test script may thus be complete and match the template. However, the test steps shown in FIG. 12 may be further compared with factors of the business requirement shown in FIG. 8 to determine deviations and the deductible scores for the evaluators of business requirements, descriptiveness and validation language requirements.

The deviations may be found during the comparison. For example, business requirements for REQ_001 may not met by the test script because the requirement ID REQ_001 in FIG. 8 is descripted as "User should be login using the basic credentials" rather than "System shall be successfully login in the user" in FIG. 12. Business Requirements for REQ_006 may also not be met because REQ_006 is missing in the test script of FIG. 12. Further, for Test step id 5, the expected results do not capture the requirement to ensure that location is captured. While REQ_005 in FIG. 8 is descripted as "User should be enter basic information for meals like date of invoice, vendor, location, amount, business reason." The word "location" is missing in the test script of FIG. 12. For Test step id 1, the expected results in FIG. 12 should use "should" instead of "shall" because "should" is used in REQ_001 in FIG. 8.

After the deviations are identified, the total score (or final score) of the test script may be determined. For the test script shown in FIG. 12, each deviation for business requirement may have three (3) deductible points, and each deviation for descriptiveness may have two (2) points. Thus, the final score for the test script shown in FIG. 12 may be calculated as: 100−(3+3+2+2)=90.

FIG. 13 shows an example of rolling up scores for a test group. As shown in FIG. 13, the average score is shown as score for a number of pre-determined categories for the test group. In FIG. 13, the test group includes employee id, employee name, crowd source project, testing category, test type and technology. Employee id may refer to the employee id of the tester. Employee name may be the name of the tester. Crowd source project may be the project that the tester may be working for as crowd sourced tester. Test category may identify if the test script developed is for validated or non-validated testing. Output values for the test category may be validated, non-validated. Test type may capture the test type of specific test. The possible values for the test type may be: system test, integration test, regression test, installation qualification, operational qualification, and performance qualification. Technology may capture the technology of specific test. The values for the technology may be: SAP, Concur, PeopleSoft, and Workday. Number of test scripts (protocol) may provide number of test scripts (protocol) created for the test.

Further information may be provided in FIG. 13. FIG. 13 shows the number of test scripts (protocol). Average score (or Score) may also be created to provide average score for the group of test scripts. Technology weight may provide weight allocated to the technology based on the complexity and test type weight may provide weight allocated to the test type based on the complexity. The aggregate score may be created for the test script for the group. Aggregate score (weighted score) may be computed based on average score, number of test scripts (protocol), technology weight and test type weight.

FIG. 14 shows an example of rolling up scores to individual testers. As shown in FIG. 14, Employee ID may be employee ID of the tester. Employee Name may be the name of the tester. FIG. 14 further shows a number of categories for individual testers. For example, Number of Test Scripts/Protocol Authored may be total number of test scripts/protocol authored by the tester. Aggregate PEC Score may be overall aggregate weighted score for all the test scripts/protocols authored. FTR Score may be average number of times score(s) that may be over and above 80 points during the first round of creation of test scripts. Number of Non-Validated Test Scripts may be total number of non-validated test scripts authored by the tester. It includes system testing, integration testing and regression testing. Score-Non-Validated Test Scripts may be score for non-validated test scripts authored by the tester. It includes system testing, integration testing and regression testing. Number of System Test Scripts may be total number of system test scripts authored by the tester. Score-System Test Scripts may be score for system test scripts authored by the tester. Number of Integration Test Scripts may be total number of Integration test scripts authored by the tester. Score-Integration Test Scripts may be score for Integration test scripts authored by the tester. Number of Regression Test Scripts may be total number of Regression test scripts authored by the tester. Score-Regression Test Scripts may be score for Regression test scripts authored by the tester. Number of Validated Test Scripts may be total number of validated test scripts authored by the tester. It includes installation qualification, operational qualification, performance qualification. Score-Validated Test Scripts may be score for validated test scripts authored by the tester. It includes installation qualification, operational qualification, performance qualification. Number of Installation Qualification Test Scripts may be total number of Installation Qualification test scripts authored by the tester. Score-Installation Qualification Test Scripts may be score for Installation Qualification test scripts authored by the tester. Number of Operational Qualification Test Scripts may be total number of Operational Qualification test scripts authored by the tester. Score-Operational Qualification Test Scripts may be score for Operational Qualification test scripts authored by the tester.

As an example, FIG. 14 shows the rolled-up scores and numbers under a number of categories listed above for two testers John Smith and Traver Mark.

Figure 15:
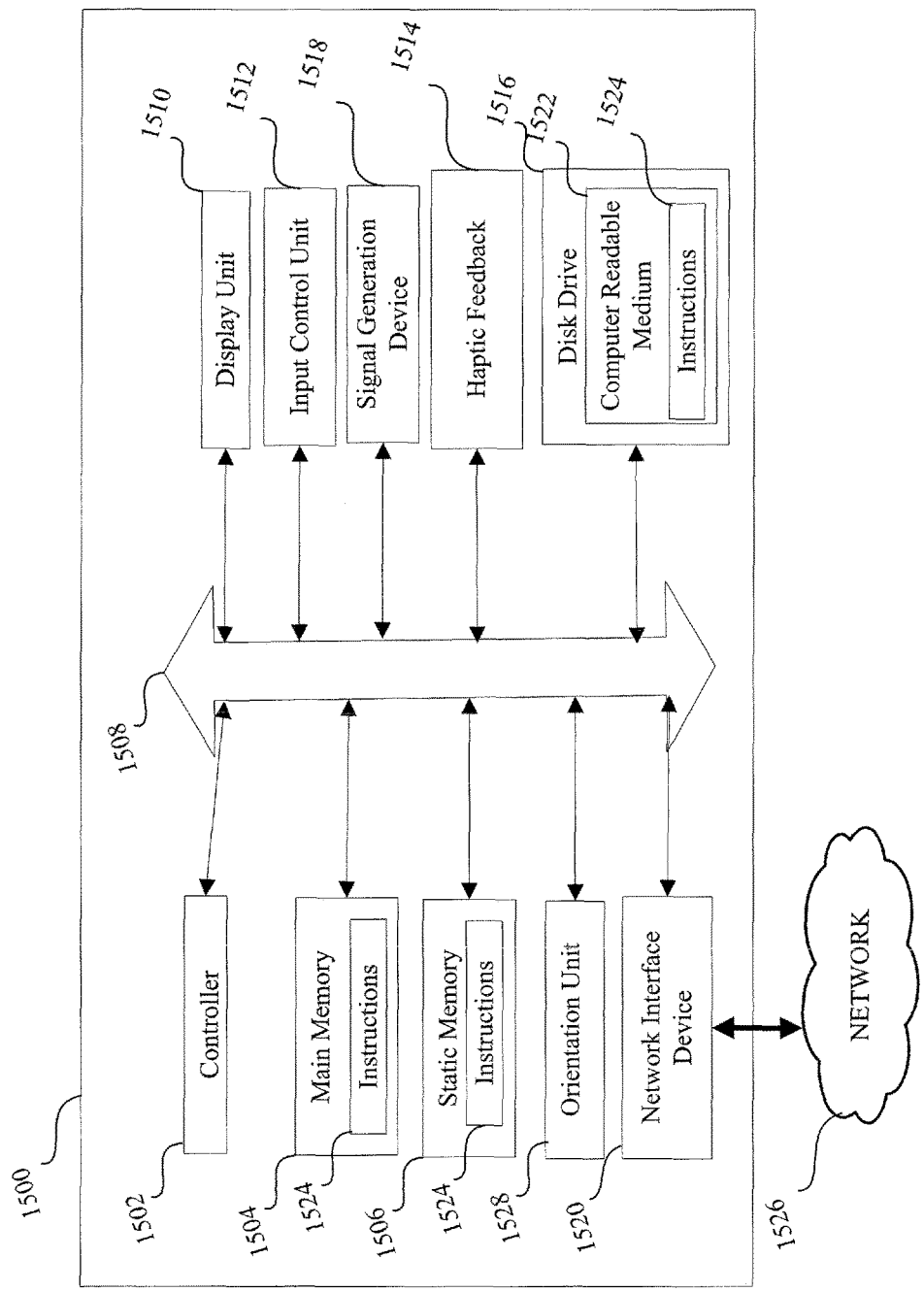
FIG. 15 illustrates an example of a computer system for evaluating one or more test scripts.

FIG. 15 illustrates an example of a computer system that may be used for evaluating a test script. Referring to FIG. 15, an illustrative embodiment of a computer system that may be used for one or more of the components illustrated by the method and the computer system in FIGS. 1-3, or in any other system configured to carry out the methods discussed in this disclosure herein, is shown and is designated 1500. Although the computer system 1500 is illustrated in FIG. 15 as including all of the components as illustrated, it is within the scope of this innovation for the computing system to be comprised of fewer, or more, components than just illustrated in FIG. 15.

The computer system 1500 can include a set of instructions 1524 that can be executed to cause the computer system 1500 to perform any one or more of the methods, processes or computer-based functions disclosed herein. For example, a test script evaluator as described herein may be a program comprised of a set of instructions 1524 that are executed by the controller 1502 to perform any one or more of the methods, processes or computer-based functions described herein. Such a program may be stored in whole, or in any combination of parts, on one or more of the exemplary memory components illustrated in FIG. 15, such as the main memory 1504, static memory 1506, or disk drive 1516.

As described, the computer system 1500 may be mobile device. The computer system 1500 may also be connected using a network 1518, to other computer systems or peripheral devices. In a networked deployment, the computer system 1500 may operate in the capacity of a server or as a client user computer in a server-client user network environment, or as a peer computer system in a peer-to-peer (or distributed) network environment. In addition to embodiments in which the computer system 1500 is implemented, the computer system 1500 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1500 is illustrated, the term "system" shall also be taken to include any collection of systems or sub-systems that individually or jointly execute a set, or multiple sets, of instructions to perform one or more computer functions.

As illustrated in FIG. 15, the computer system 1500 may include a controller 1502, such as a central processing unit ("CPU"), a graphics processing unit ("GPU"), or both. Moreover, the computer system 1500 can include a main memory 1504, and additionally may include a static memory 1506. In embodiments where more than one memory components are included in the computer system 1500, the memory components can communicate with each other via a bus 1508. As shown, the computer system 1500 may further include a display unit 1510, such as a liquid crystal display ("LCD"), an organic light emitting diode ("OLED"), a flat panel display, a solid state display, or a cathode ray tube ("CRT"). Additionally, the computer system 1500 may include one or more input devices 1512, such as a keyboard, push button(s), scroll wheel, digital camera for image capture and/or visual command recognition, touch screen, touchpad or audio input device (e.g., microphone). The computer system 1500 can also include signal outputting components such as a haptic feedback component 1514 and a signal generation device 1518 that may include a speaker or remote control.

Although not specifically illustrated, the computer system 1500 may additionally include a GPS (Global Positioning System) component for identifying a location of the computer system 1500.

Additionally, the computer system 1500 may include an orientation unit 1528 that includes any combination of one or more gyroscope(s) and accelerometer(s).

The computer system 1500 may also include a network interface device 1520 to allow the computer system 1500 to communicate via wireless, or wired, communication channels with other devices. The network interface device 1520 may be an interface for communicating with another computer system via a Wi-Fi connection, Bluetooth connection, Near Frequency Communication connection, telecommunications connection, internet connection, wired Ethernet connection, or the like. The computer system 1500 may also optionally include a disk drive unit 1516 for accepting a computer readable medium 1522. The computer readable medium 1522 may include a set of instructions that are executable by the controller 1502, and/or the computer readable medium 1522 may be utilized by the computer system 1500 as additional memory storage.

In a particular embodiment, as depicted in FIG. 15, the disk drive unit 1516 may include a computer-readable medium 1522 in which one or more sets of instructions 1524, such as software, can be embedded. Further, the instructions 1524 may embody one or more of the methods, processes, or logic as described herein. In a particular embodiment, the instructions 1524 may reside completely, or at least partially, within the main memory 1504, the static memory 1506, and/or within the controller 1502 during execution by the computer system 1500. The main memory 1504 and the controller 1502 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1500 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1522 that includes instructions 1524 or receives and executes instructions 1524 responsive to a propagated signal; so that a device connected to a network 1518 can communicate voice, video or data over the network 1518. Further, the instructions 1524 may be transmitted or received over the network 1518 via the network interface device 1520.

While the computer-readable medium 1524 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1522 can include a solid-state memory such as a memory card or other package that houses one or more non-volatile read-only memories, such as flash memory. Further, the computer-readable medium 1522 can be a random access memory or other volatile re-writable memory. Additionally, the computer-readable medium 1522 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1522 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by software development, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A method for evaluating one or more test scripts used testing aspects target system, comprising:
   receiving, via a communications interface, a test script and a plurality of requirements for the test script wherein the plurality of requirements facilitate evaluation of the test script and are in pre-determined format;
   developing a set of protocol evaluators based on the plurality of requirements, wherein the set of protocol evaluators comprises a business requirements evaluator, a validation language requirements evaluator, a template evaluator, a completeness evaluator, and a descriptiveness evaluator, wherein each protocol evaluator of the set of protocol evaluators contains one or more factors;
   storing the developed set of protocol evaluators in a computer readable memory;

executing each protocol evaluator with a protocol evaluation engine, wherein:
execution of the business requirements evaluator controls the protocol evaluator to determine whether the test script tests specified business requirements,
execution of the language requirements evaluator controls the protocol evaluator to determine whether the test script is written in a specified language,
execution of the template evaluator controls the protocol evaluator to determine whether the test script is prepared using a specified template,
execution of the completeness evaluator controls the protocol evaluator to determine whether the test script meets completeness requirements, and
execution of the descriptiveness evaluator controls the protocol evaluator to determine whether the test script meets descriptiveness requirements,
wherein execution of each protocol evaluator with the protocol evaluation engine the further comprises assigning an initial score to the test script;
for each protocol evaluator:
comparing the one or more factors of the protocol evaluator with the test script to thereby determine whether the test script deviates with at least one of the one or more factors of the protocol evaluator, and in response assigning a deviation thereto;
determining a deductible points for each deviation according to a pre-determined rule up to a maximum deductible points;
subtracting the deductible points from the initial score for the test script to thereby obtain a final score; and
generating a group score for a plurality of test scripts based on a pre-determined category and the final score of the plurality of test scripts for identifying a tester for the test script based on the group score.

2. The method of claim 1, wherein for a predetermined subset of deviations, the corresponding deductible points comprises the initial score as the deductible points for the deviation such that upon subtracting the deductible points from the initial score, a zero point score is allocated as the final score and the evaluating is terminated.

3. The method of claim 2, wherein the predetermined subset of deviations comprises the test script is not in a right template or the test script is not completed.

4. The method of claim 1, wherein generating the group score comprises adding up the final scores according to the pre-determined category.

5. The method of claim 1, wherein the group score comprises: a tester based score and a test script based score.

6. The method of claim 5, wherein the tester based score comprises an identification for the tester.

7. The method of claim 5, wherein the test script based score comprises an aggregate score that is computed according to the final score.

8. The method of claim 7, wherein the test script based score is generated by using the aggregate score wherein the tester based score comprises a plurality of pre-determined tester categories.

9. A computer system, comprising:
a processor coupled with a communications interface and a non-transitory computer readable medium storing processor executable instructions comprising a protocol evaluation engine that evaluates one or more test scripts configured to cause the processor to:
receive a test script and a plurality of requirements for the test script via the communications interface, wherein the plurality of requirements facilitate evaluation of the test script and are in pre-determined format;
develop a set of protocol evaluators based on the plurality of requirements evaluator wherein the set of protocol evaluators comprises a business requirements, a validation language requirements evaluator, a template evaluator, a completeness evaluator and a descriptiveness evaluator, wherein each protocol evaluator contains one or more factors;
store the developed set of protocol evaluators in a computer readable memory;
execute each protocol evaluator with a protocol evaluation engine, wherein:
execution of the business requirements evaluator controls the protocol evaluator to determine whether the test script tests specified business requirements,
execution of the language requirements evaluator controls the protocol evaluator to determine whether the test script is written in a specified language,
execution of the template evaluator controls the protocol evaluator to determine whether the test script is prepared using a specified template,
execution of the completeness evaluator controls the protocol evaluator to determine whether the test script meets completeness requirements, and
execution of the descriptiveness evaluator controls the protocol evaluator to determine whether the test script meets descriptiveness requirements,
wherein execution of each protocol evaluator with the protocol evaluation engine the further comprises:
assigning an initial score to the test script; for each protocol evaluator:
comparing the one or more factors of the protocol evaluators with the test script, and determining whether the test script deviates with at least one of the one or more factors, and in response assigning a deviation thereto;
determining a deductible points for each deviation according to a pre-determined rule up to a maximum deductible points, and determining a final score for the evaluator for the test script by subtracting the deductible points from the initial score for the test script to obtain the final score; and
generate a group score for a plurality of test scripts based on a pre- determined category and the final score of the plurality of test scripts for identifying a tester for the test script based on the group score.

10. The computer system of claim 9, wherein for a predetermined subset of deviations, the corresponding deductible points comprises the initial score as the deductible points for the deviation such that upon subtracting the deductible points from the initial score, a zero point score is allocated as the final score and the evaluating is terminated.

11. The computer system of claim 10, wherein the predetermined subset of deviations comprises the test script is not in a right template or the test script is not completed.

12. The computer system of claim 9, wherein the instructions configured to cause the one or more processors to generate the group score further comprise instructions configured to cause the one or more processors to add up the final scores according to the pre-determined category.

13. The computer system of claim 9, wherein the group score comprises: a tester based score and a test script based score.

14. The computer system of claim 13, wherein the tester based score comprises an identification for the tester.

15. The computer system of claim 13, wherein the test script based score comprises an aggregate score that is computed according to the final score.

16. The computer system of claim 15, wherein the instructions configured to cause the one or more processors to generate the group score may further comprise instructions configured to cause the one or more processors to generate the tester based score by using the aggregate score wherein the tester based score comprises a plurality of pre-determined tester categories.

* * * * *